(12) United States Patent
Buddington et al.

(10) Patent No.: US 12,085,774 B2
(45) Date of Patent: Sep. 10, 2024

(54) SYSTEM AND DEPLOYMENT METHOD FOR A FIBER OPTIC CONNECTOR ASSEMBLY HAVING A BLOWABLE SECTION AND A NON-BLOWABLE SECTION

(71) Applicant: COMMSCOPE TECHNOLOGIES LLC, Hickory, NC (US)

(72) Inventors: Geoffrey Buddington, Stoke by Clare (GB); Jose-Luis Gonzalez Blazquez, Madrid (ES); Patrick Jacques Ann Diepstraten, Beringen (BE); Neil Stewart Bird, Vlaams Brabant (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 17/744,206

(22) Filed: May 13, 2022

(65) Prior Publication Data
US 2022/0390702 A1      Dec. 8, 2022

Related U.S. Application Data

(63) Continuation of application No. PCT/US2020/061525, filed on Nov. 20, 2020.
(Continued)

(51) Int. Cl.
*G02B 6/52* (2006.01)
*G02B 6/38* (2006.01)
*G02B 6/44* (2006.01)

(52) U.S. Cl.
CPC ............ *G02B 6/52* (2013.01); *G02B 6/3825* (2013.01); *G02B 6/4458* (2013.01); *G02B 6/4471* (2013.01)

(58) Field of Classification Search
CPC ................................ G02B 6/52; G02B 6/4458
See application file for complete search history.

(56) References Cited

U.S. PATENT DOCUMENTS

| 5,863,083 A | 1/1999 | Giebel et al. |
| 6,049,155 A | 4/2000 | Graebner et al. |

(Continued)

FOREIGN PATENT DOCUMENTS

| EP | 2 012 153 A1 | 7/2009 | |
| GB | 2559489 B * | 2/2019 | ............ G02B 6/443 |

(Continued)

OTHER PUBLICATIONS

International Search Report and Written Opinion of the International Searching Authority for International Patent Application No. PCT/US2020/061525 dated Mar. 15, 2021, 11 pages.

(Continued)

*Primary Examiner* — Sung H Pak
(74) *Attorney, Agent, or Firm* — Merchant & Gould P.C.

(57) ABSTRACT

Systems, assemblies and methods for deploying an optical fiber through a duct to a customer premises. A blowable section of the optical fiber is blown through the duct. A non-blowable section of the optical fiber is coupled to a trail end of the duct. The non-blowable section can be terminated with a hardened or ruggedized connector. The optical fiber, including both the blowable and non-blowable sections, can be wound around a spool for easy payout of the blowable section.

6 Claims, 7 Drawing Sheets

Related U.S. Application Data

(60) Provisional application No. 62/938,037, filed on Nov. 20, 2019.

(56) References Cited

U.S. PATENT DOCUMENTS

| | | | |
|---|---|---|---|
| 6,409,155 | B1 | 6/2002 | Brown et al. |
| 7,292,763 | B2 | 11/2007 | Mertesdorf et al. |
| 8,834,038 | B2 | 9/2014 | Limbert et al. |
| 9,470,850 | B2 | 10/2016 | Ott et al. |
| 10,775,578 | B2 | 9/2020 | Limbert et al. |
| 11,022,769 | B2 | 6/2021 | Kirkpatrick |
| 11,428,884 | B2 | 8/2022 | Limbert et al. |
| 2010/0178020 | A1 | 7/2010 | Griffioen et al. |
| 2011/0024543 | A1* | 2/2011 | Smrha .................. H01R 13/72 242/388 |
| 2011/0305424 | A1 | 12/2011 | Pierce et al. |
| 2013/0216191 | A1 | 8/2013 | Yamauchi et al. |
| 2018/0299632 | A1 | 10/2018 | Van Baelen et al. |
| 2020/0284991 | A1 | 9/2020 | Mullaney et al. |

FOREIGN PATENT DOCUMENTS

| | | |
|---|---|---|
| WO | 2009/076364 A2 | 6/2009 |
| WO | 2018146470 A1 | 8/2018 |
| WO | 2020/174254 A1 | 9/2020 |

OTHER PUBLICATIONS

Dodds, Chris, "Introducing QKWconnect from Emtelle," https://www.cablejoints.co.uk/blog/article/introducing-qwkconnect-from-emtelle, Oct. 26, 2016, 6 pages.

"The Plug & Play Ruggedised Drop Solution," Fibretap Technical Overview, 8 pages, admitted as prior art as of Nov. 20, 2019.

FibreFlow 2019 Brochure, 60 pages, admitted as prior art as of Nov. 20, 2019.

CommScope Product NewsFlash, Real Flex® Pushable Hardened Drop Cable: New Product, PB-00000-EN, Dec. 7, 2018 (2 pages).

PHD-HO1P-0100F—Real Flex® Pushable Hardened Drop Cable, Hardened to Stub, 100 FT, Dec. 11, 2018 (2 pages).

CommScope Product NewsFlash, Real Flex® Pushable Hardened Drop Cable: New Product, PB-113222-EN, Dec. 7, 2018 (2 pages).

CommScope Product End-of-Life Notification, Sep. 2019—Pushable Hardened Fiber Drop Cable Assemblies (2 pages).

CommScope Fiber drop cable solutions—Flexible solutions for the evolving networks of tomorrow, BR-1125322-EN, Aug. 2019 (14 pages).

Letter to Mike Ouyang & Patrick Diepstraten of CommScope Jul. 5, 2022 (4 pages).

Letter to Patrick Diepstraten of CommScope May 3, 2022 (9 pages).

Emtelle UK Limited and Commscope Technologies LLC, Statement of Grounds by Emtelle UK Limited, Mar. 13, 2023 (81 pages).

160-02 Series LCv-Venturi™ Connector, Ridgemount Technologies Ltd., Copyright © 2022 (2 pages).

Emtelle UK Limited and Commscope Technologies LLC, Counterstatement of Commscope Technologies LLC, Jul. 12, 2023 (76 pages).

Extended European Search Report of corresponding EP Appln. 20891192.5, dated Jun. 6, 2024.

* cited by examiner

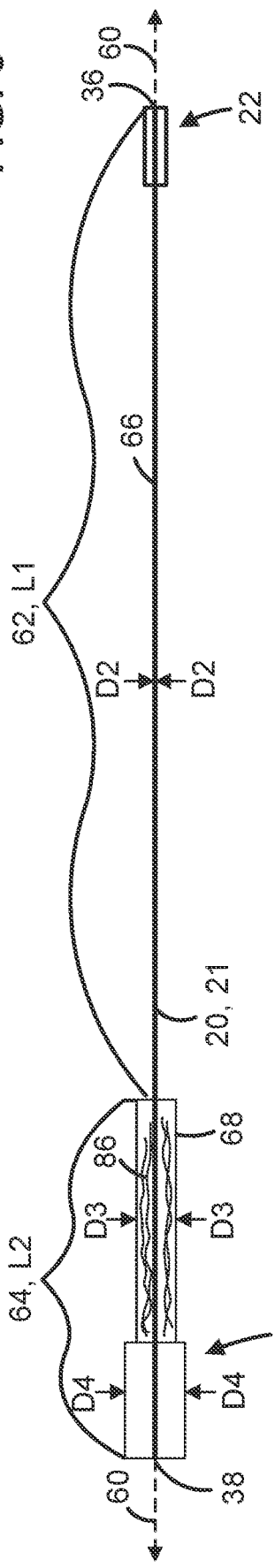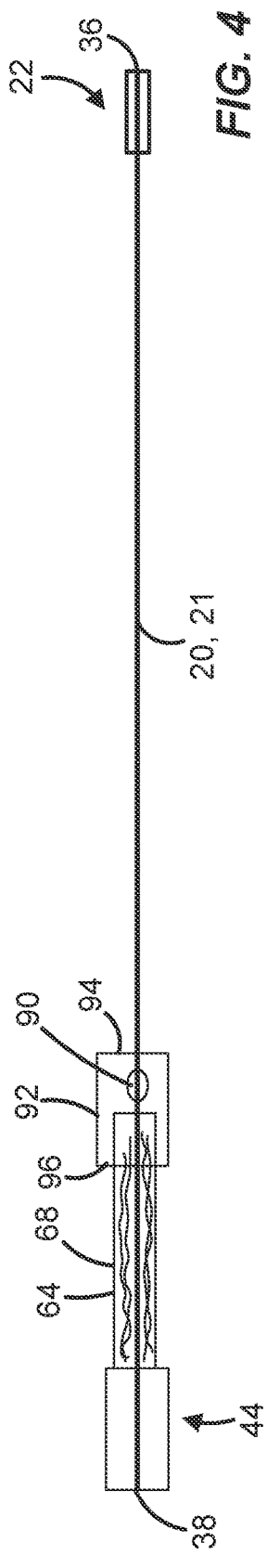

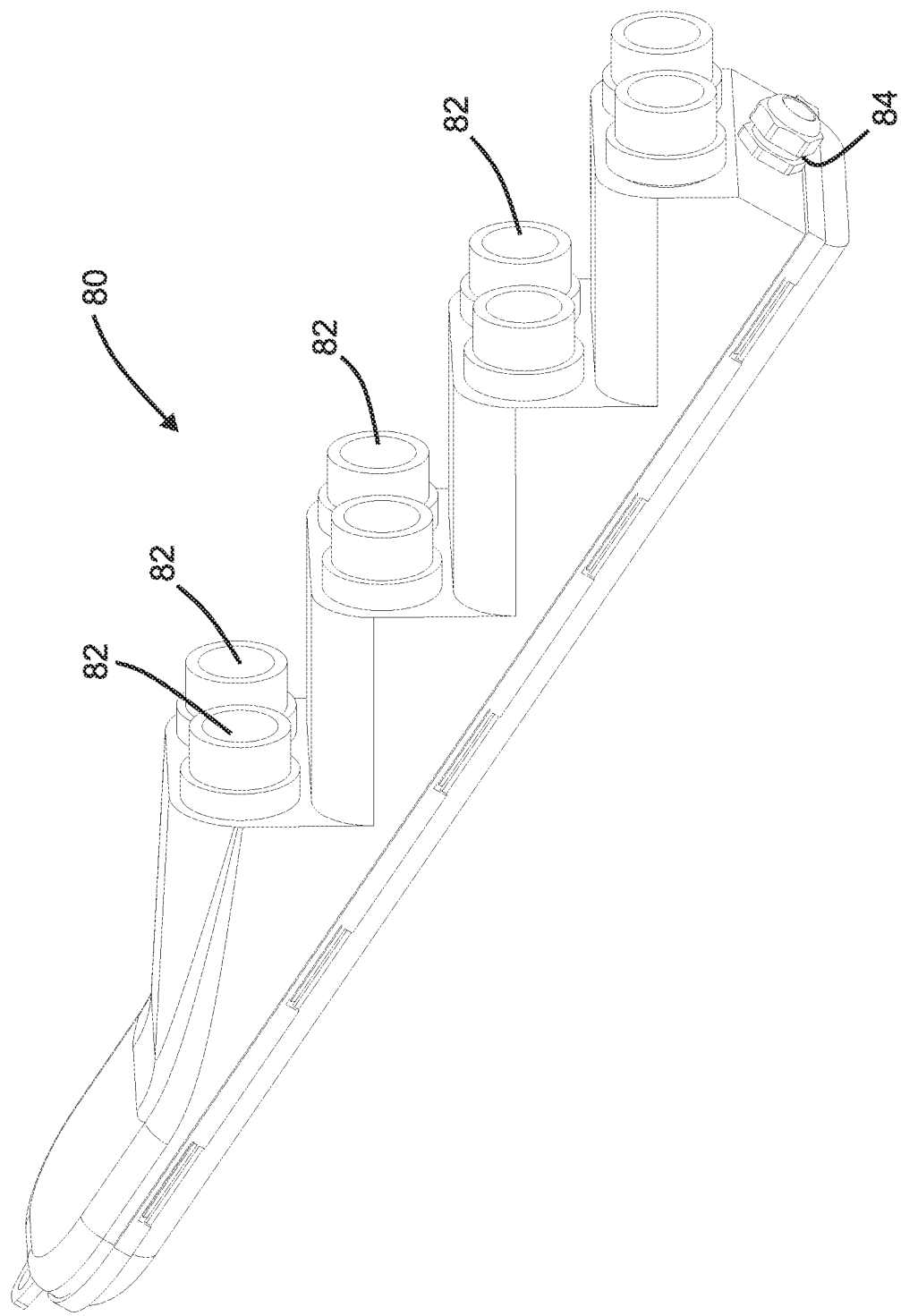

SYSTEM AND DEPLOYMENT METHOD FOR A FIBER OPTIC CONNECTOR ASSEMBLY HAVING A BLOWABLE SECTION AND A NON-BLOWABLE SECTION

CROSS-REFERENCE TO RELATED APPLICATION

This application is a Continuation of International Patent Application No. PCT/US2020/061525, filed on Nov. 20, 2020, which claims the benefit of U.S. Patent Application Ser. No. 62/938,037, filed on Nov. 20, 2019, the disclosures of which are incorporated herein by reference in their entireties. To the extent appropriate, a claim of priority is made to each of the above disclosed applications.

BACKGROUND

Fiber optic communication systems deliver high bandwidth communication capabilities to customers. Optical fiber connectors are an important part of most fiber optic communication systems. Fiber optic connectors allow two optical fibers to be quickly, optically connected without requiring a splice. Fiber optic connectors can be used to optically interconnect two lengths of optical fiber. Optical fiber connectors can also be used to interconnect lengths of optical fiber to passive and active equipment.

Expansion of fiber optic based telecommunication service is being extended to a greater diversity of businesses and homes. Many of these extensions of service within neighborhoods, industrial parks and business developments utilize optical fiber distribution cables laid within buried conduit or ductwork. Such optical fiber distribution cables might extend from a larger fiber distribution terminal or pedestal to a smaller fiber access terminal directly adjacent the business or home to which service may be provided. From the fiber access terminal to the home or business, a fiber drop cable may connect to the home or business.

A fiber distribution terminal may be configured to receive fibers from a central office and contain a number of splitters. Each of the fibers from the central office may carry a large number of signals and the splitters separate the compound signals into individual circuits. These individual circuits are then transmitted through individual optical fibers. Each of the fibers from the main office may enter one of the splitters in the fiber distribution terminal and the splitter may direct each of these signals into up to thirty-two fibers. A typical fiber distribution terminal may be configured to support from 100 fibers up to 1500 fibers. The smaller fiber access terminals may more typically house up to 8 or 12 fibers. The fiber distribution cables between the fiber distribution terminal and the fiber access terminal may have these eight to twelve fibers bundled together in a single multi-strand cable. Within the fiber access terminal, these multiple strands are broken out of the multistrand cable so that each fiber may be directed to an individual customer.

A fiber access terminal is often placed in a hand hole below grade near the customer location, attached to, or positioned within a cavity of, a telephone pole near the customer location, or attached to an aerially suspended power line or other cable near the customer location. Examples of fiber access terminals are described in U.S. Pat. No. 7,292,763, the contents of which are hereby incorporated by reference in their entirety.

Drop cables terminated at the supply side with ruggedized connectors are connected to the fiber access terminal and routed to the customer location(s). Since the fiber access terminal can be exposed to the elements outdoors, the drop cables and their supply side connectors are ruggedized to protect them from external loads. Examples of ruggedized connectors are described, for example, in International Patent Publication No. WO 2009/076364, the contents of which are fulling incorporated herein by reference in their entirety.

Currently, a variety of techniques are available for pulling, pushing or blowing a cable through a duct. For example, United Kingdom Patent GB 2559489B is incorporated herein in its entirety and describes blowing a lightweight length of fiber through a duct.

However, ruggedized cables can be too heavy and/or too thick to be blown or otherwise deployed through a duct between a fiber access terminal and a customer location.

SUMMARY

In general terms, the present disclosure is directed to optical fiber assemblies and associated methods. The optical fiber assemblies include a blowable fiber section that can be blown through a duct, and a non-blowable fiber section that can be connected, e.g., to a hardened port of a terminal or closure.

According to certain aspects of the present disclosure, a blown fiber assembly comprises: a spool; an optical drop line including a blowable fiber section adapted to be blown through a fiber duct and a sheathed fiber section, the sheathed fiber section having an outer dimension at least 2 times as large as an outer dimension of the blowable fiber section, the blowable fiber section being at least 25 times as long as the sheathed fiber section, the blowable fiber section and the sheathed fiber section being coiled about the spool with the blowable fiber section being coiled about the spool farther from a rotation axis of the spool than the sheathed fiber section; a partial connector factory terminated at an end of the blowable fiber section; and a hardened fiber optic connector factory terminated at an end of the sheathed fiber section.

According to further aspects of the present disclosure, a blown fiber assembly comprises: a spool; an optical drop line including a blowable fiber section adapted to be blown through a fiber duct and a sheathed fiber section, the blowable fiber section being at least 25 times as long as the sheathed fiber section, the blowable fiber section and the sheathed fiber section being coiled about the spool with the blowable fiber section being coiled about the spool farther from a rotation axis of the spool than the sheathed fiber section; a partial connector factory terminated at an end of the blowable fiber section; and a hardened fiber optic connector factory terminated at an end of the sheathed fiber section, the hardened fiber optic connector having am outer dimension that is at least 8 times as large as an outer dimension of the blowable fiber section.

According to further aspects of the present disclosure, a fiber optic connector system for deploying optical fiber through a duct defined by a longitudinal duct axis and having a largest duct interior dimension perpendicular to the longitudinal duct axis, comprises: an optical fiber defined by a longitudinal fiber axis extending between a trail end and a lead end of the optical fiber, the optical fiber including: a first axial section having a longitudinal length of at least 1.0 meters and extending axially from the lead end of the optical fiber toward the trail end of the optical fiber, the first axial section being surrounded by a first outermost protective layer at a trail end of the first axial section, the first outermost protective layer having a largest dimension perpendicular to the longitudinal fiber axis that is less than the largest duct interior dimension; and a second axial section having a longitudinal length of at least 0.1 meters and extending from the trail end of the optical fiber towards the lead end of the optical fiber, the second axial section being pre-terminated at a fiber optic connector positioned at the trail end of the optical fiber, the second axial section being surrounded by a sheath defining a second outermost protective layer extending axially from the connector to a lead end of the second axial section, the second outermost protective layer having a largest dimension perpendicular to the longitudinal fiber axis that is greater than or equal to the largest interior duct dimension.

According to further aspects of the present disclosure, a fiber optic connector system for deploying optical fiber through a duct defining a longitudinal duct axis and having a largest duct interior dimension perpendicular to the longitudinal axis, comprises: an optical fiber defining a longitudinal fiber axis extending between a trail end and a lead end of the optical fiber, the optical fiber including: a first axial section having a longitudinal length of at least 1.0 meters and extending axially from the lead end of the optical fiber towards the trail end of the optical fiber, the first axial section being surrounded by a first outermost protective layer at a trail end of the first axial section, the first outermost protective layer having a largest dimension perpendicular to the longitudinal fiber axis that is less than the largest duct interior dimension; and a second axial section extending from the trail end of the optical fiber towards the lead end of the optical fiber, the second axial section being pre-terminated at a fiber optic connector positioned at the trail end of the optical fiber, the connector having a largest outer dimension perpendicular to the longitudinal fiber axis that is greater than or equal to the largest duct interior dimension.

According to further aspects of the present disclosure, a fiber optic connector system, comprises: a spool; and an optical fiber defined by a longitudinal fiber axis extending between a trail end and a lead end of the optical fiber, the optical fiber being spooled about the spool and including: a first axial section having a longitudinal length of at least 1.0 meters and extending axially from the lead end of the optical fiber toward the trail end of the optical fiber, the first axial section being configured to be blown through a duct having a predefined size; and a second axial section having a longitudinal length of at least 0.1 meters and extending from the trail end of the optical fiber towards the lead end of the optical fiber, the second axial section being pre-terminated at a fiber optic connector positioned at the trail end of the optical fiber, the second axial section not being configured to be blown through the duct, wherein the first and second axial sections are wound about the spool such that the spool is configured to payout the first axial section before the second axial section.

According to further aspects of the present disclosure, a method comprises: providing a duct having a length extending from a duct trail end to a duct lead end along a longitudinal duct axis; providing an optical fiber defined by a longitudinal fiber axis extending between a fiber trail end and a fiber lead end of the optical fiber, the optical fiber including a first axial section having a longitudinal length of at least 1.0 meters and extending axially from the fiber lead end toward the fiber trail end, and a second axial section having a longitudinal length of at least 0.1 meters and extending from the first axial section towards the fiber trail end, the entire longitudinal length of the second axial section having a largest dimension perpendicular to the longitudinal fiber axis that exceeds a largest inner dimension of the duct perpendicular to the longitudinal duct axis; advancing the lead end of the optical fiber through the entire length of the duct; and subsequent to the advancing, fastening a lead end of the second axial section to the duct trail end.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the examples disclosed herein are based.

BRIEF DESCRIPTION OF THE DRAWINGS

FIG. 3 is a schematic view of an example fiber optic connector assembly in accordance with the present disclosure.

FIG. 4 is a schematic view of a further example fiber optic connector assembly in accordance with the present disclosure.

FIG. 5 is an example ruggedized (or hardened) connector that can terminate the trail end of the optical fiber of the fiber optic connector assemblies of FIGS. 1-4.

DETAILED DESCRIPTION

Figure 1:
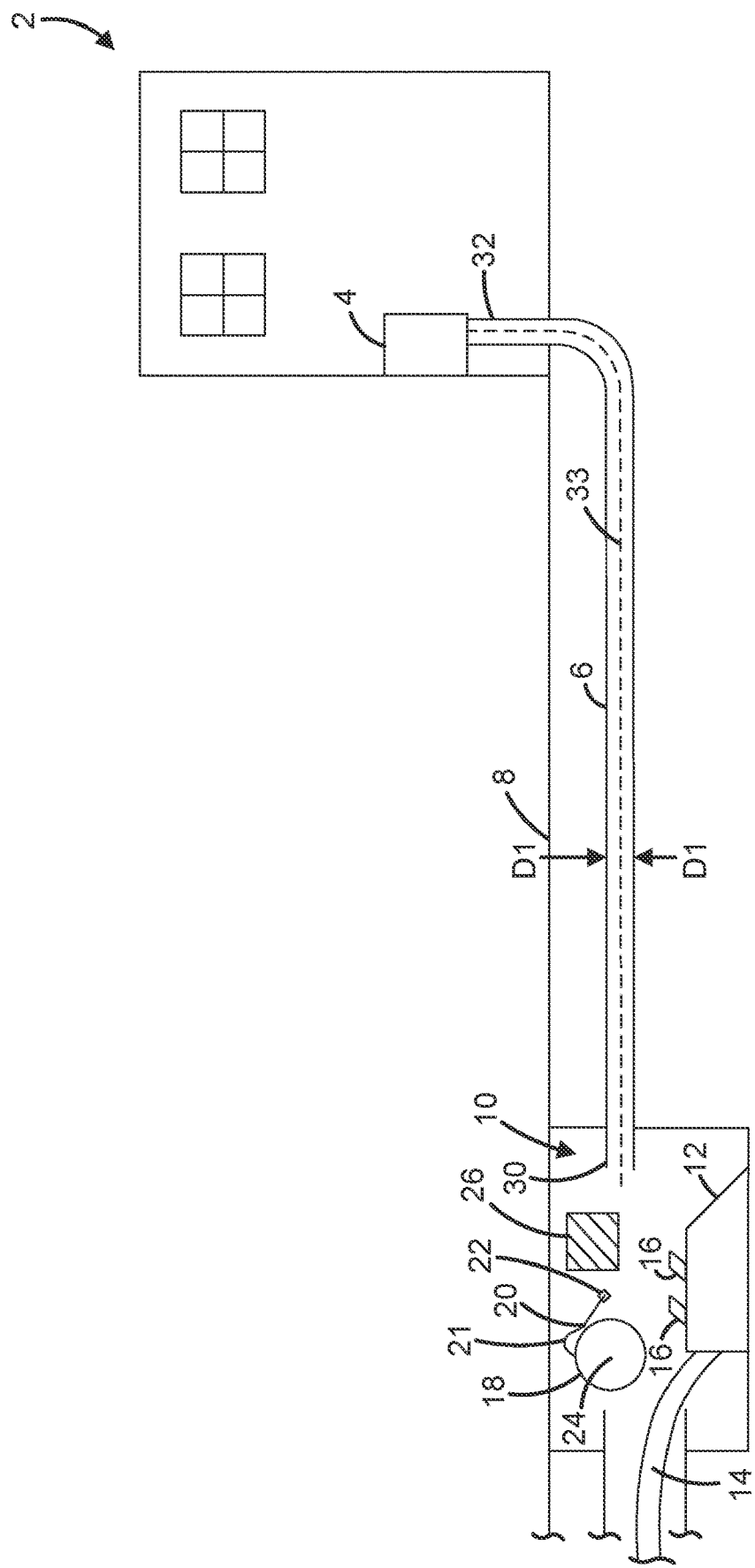
FIG. 1 is a schematic view of components of a fiber optic connector system in accordance with the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Referring to FIG. 1, a customer building 2 (e.g., a residence or business) receives and transmits data signals via a telecommunications system in accordance with the present disclosure. The building 2 includes equipment 4, such as a wall-mounted box at which one or more optical fibers of the telecommunications network is operatively connected. Excess fiber slack can be stored in one or more loops at the wall-mounted box or another fiber storage structure at the building 2. A duct 6 is buried below the ground 8. The duct 6 provides a passage for one or more optical fibers extending between a hand hole 10 and the building 2. The number of fibers supported by the duct 6 can depend on the number of different customers at the building 2 and/or the amount of bandwidth required at the building 2. Multiple, separate, ducts can be provided for multiple customers or, alternatively, a single duct can define multiple channels, where each channel receives an individual fiber or group of fibers (e.g., two fibers).

A fiber management terminal 12, such as a fiber access terminal, is positioned within the hand hole 10. A feeder cable 14 is routed underground (or from above ground) to the terminal 12. Fibers from the feeder cable 14 are managed within the terminal 12 and connected to fibers that are routed to the customer location, e.g., via the duct 6. The terminal 12 includes ruggedized ports 16 adapted to sealingly receive and secure ruggedized connectors that terminate optical fibers that are routed to the customer location. The ruggedized ports 16 can be adapted to receive the connectors in a twist-to-lock fashion (e.g., via complementary threaded portions at the port and the connector, complementary bayonet lock components, etc.). A sealing element (e.g., an O-ring or gasket positioned at the port and abutting the connector can minimize egress of contaminants into the closure via the port when the connector is mated at the port. When not in use, the ports can be sealingly plugged.

In alternative use applications, one or more of the feeder cable 14, the terminal 12 and/or the duct 6 can be positioned above ground. For example, the terminal 12 can be mounted to an aerially suspended cable or to a telephone pole, or positioned within a cavity within a telephone pole.

An optical drop line 21 including an optical fiber 20 is wound around a spool 18. A single optical fiber will be described herein; however, it should appreciated that the same principles can apply to a multi-fiber arrangement that is wound around the spool 18.

The optical fiber 20 is used to operatively connect the terminal 12 and the equipment 4. The optical fiber 20 includes a blowable fiber section and a non-blowable fiber section, both of which portions are initially wound around the spool 18. When wound around the spool, the non-blowable fiber section is generally positioned radially closer to the rotation axis 24 (extending into the page in FIG. 1) defined by the spool as compared with the blowable fiber section, which is generally positioned radially farther from the rotation axis 24. Thus, when unwinding the optical fiber 20 from the spool, the blowable section is paid out before the non-blowable section.

The blowable section is terminated at a lead end of the optical fiber 20 with a partial fiber optic connector 22, such as a ferrule and a spring. The trail end of the optical fiber 20 is terminated with a ruggedized connector, which coincides with the trail end of the non-blowable section of the optical fiber. The optical fiber 20 defines a longitudinal axis extending from the lead end of the optical fiber to the trail end of the optical fiber. These terminations, along with winding the optical drop line 21 about the spool can be performed at the factory, rather than in the field.

To blow the blowable section of the optical fiber 20 through the duct 6 from the trail end 30 of the duct 6 to the lead end 32 of the duct 6 along the longitudinal axis 33 defined by the duct, a blowing machine 26 can be used, which can be mounted to the trail end 30 of the duct and generates a jet of air or another fluid to propel the blowable section of the optical fiber 20 such that the lead end of the optical fiber 20 extends beyond the lead end 32 of the duct 6 and can be connected and/or stored at or near the equipment 4. As the blowable section of the optical fiber 20 is blown along the duct 6, the blowable section is paid out from the spool as the spool 18 rotates about the rotation axis 24.

The payout continues until the entire blowable section is unwound from the spool 18. At this point, the non-blowable section can be unwound (e.g., manually) from the spool 18, and a lead end of the non-blowable portion can be secured to the trail end 30 of the duct, optionally with a gas block to seal off the trail end of the duct. In addition, the ruggedized connector can be operatively connected to the terminal 12 at one of the ruggedized ports 16. On the customer side, the partial connector can be completed, e.g., by installing a connector body onto the ferrule, and the completed connector can be operatively installed at the equipment 4 to provide network link to the building 2. Excess slack of the blowable section that has cleared the lead end 32 of the duct 6 can be looped at a storage location at the building 2.

The process can be repeated for as many fibers as needed to be routed to the building 2 and/or other buildings in the vicinity of the building 2 that are served by the same man hole and/or the same terminal 12, provided that such fibers can be accommodated by the terminal 12 (e.g., there are sufficient ports 16 at the terminal 12), and the associated ductwork (e.g., there are sufficient ducts and discrete fiber channels within ducts).

The duct defines a largest internal dimension D1 perpendicular to the longitudinal axis 33. In some examples, the duct defines a circular cross-section, with the internal dimension D1 being a diameter of that cross-section.

Figure 2:
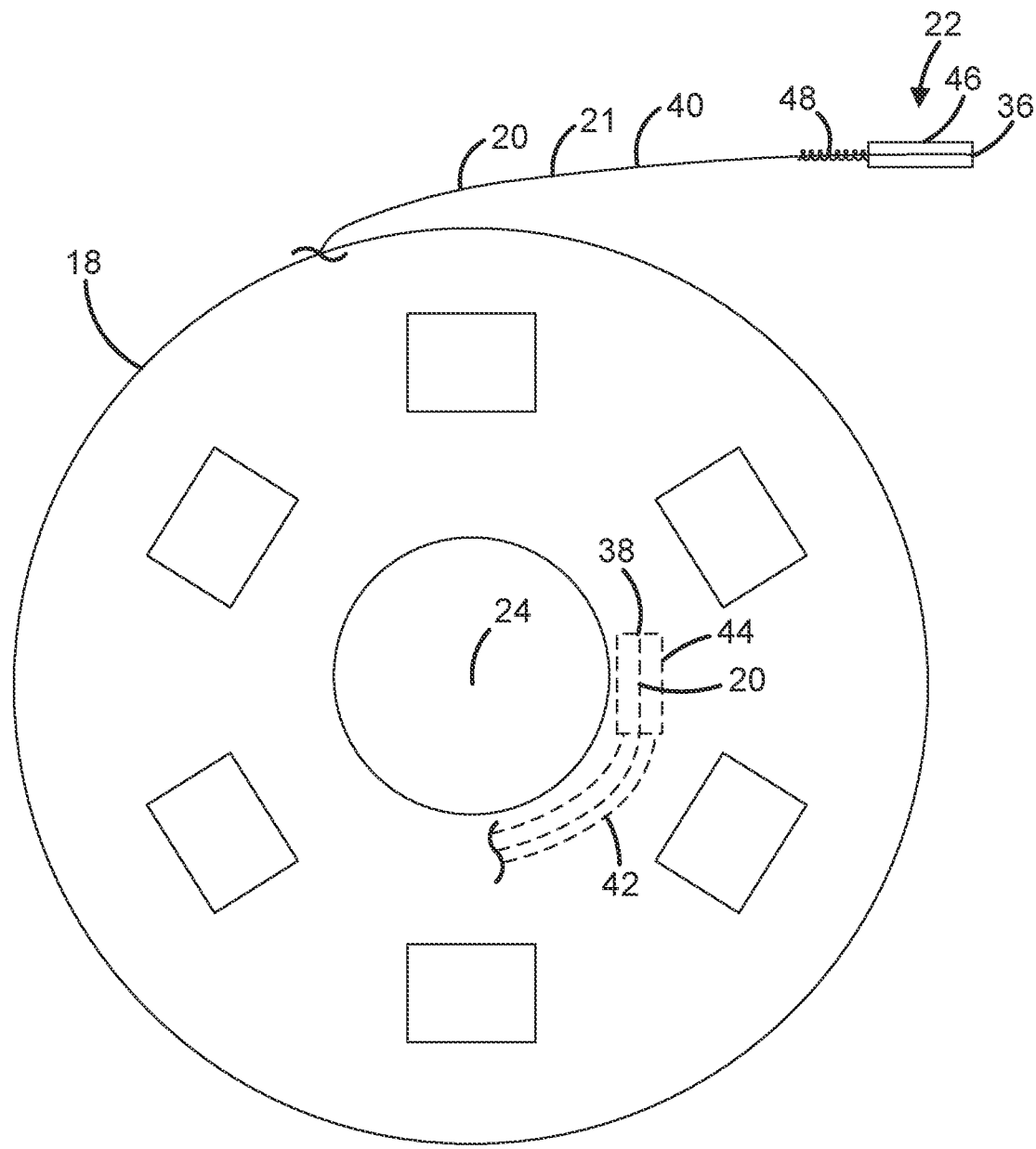
FIG. 2 is a schematic view of an example embodiment of a spool and portions of an example fiber optic connector assembly according to the present disclosure.

Referring to FIG. 2, which schematically illustrates additional features of the spool 18 of FIG. 1, the optical fiber is axially continuous along the longitudinal axis defined by the fiber between a lead end 36 of the optical fiber and a trail end 38 of the optical fiber. The lead end 36 is terminated at the partial connector 22, which consists of a ferrule 46 and a spring 48 for axially biasing the ferrule once the remainder of the full connector is assembled about the partial connector 22. The blowable portion 40 of the optical fiber 20 extends from the partial connector 22 towards the trail end 38 of the optical fiber 20.

The trail end 38 of the optical fiber 20 is terminated at a ruggedized connector 38 which extends from the non-blowable section 42 of the optical fiber 42. The non-blowable section 42 and the ruggedized connector 38 are positioned closer to the rotation axis 24 than the blowable section 40 prior to payout of the optical fiber 20.

In some examples, one or more sections of fiber are spliced together to form the continuous optical fiber 20. Such splice(s) can be formed, for example, in the factory, allowing for quick installation and payout from the spool 18 in the field. Such splices can be positioned, e.g., in the ruggedized connector 38 and/or within the partial connector 22, or adjacent thereto if the ruggedized connector 38 and/or partial connector 22 is formed with a stub fiber. One or more splices can alternatively or additionally be provided at one or more intermediate positions between the ruggedized connector and the partial connector. In some examples, the optical fiber 20 includes no splices.

Although the optical fiber 20 will be described herein as including a blowable section (or portion) and a non-blowable section (or portion), the optical fiber may, in addition, or alternatively, define other duct-advancement characteristics. For example, the section 40 can be pullable through a given duct, while the section 42 is not pullable through the same duct. In another example, the section 40 can be pushable through a given duct, while the section 42 is not pushable through the same duct.

The spool 18 allows for deploying a relatively longer length, lighter weight (per longitudinal unit length), and thinner section of a fiber in one direction (e.g., towards a customer location) and deploying a relatively shorter length, heavier weight (per longitudinal unit length) and thicker section of a fiber in another direction, e.g., to connect the ruggedized connector to a fiber access terminal.

Referring to FIG. 3, an example optical fiber 20 for spooling around a spool in accordance with the present disclosure is depicted schematically. The optical fiber 20 extends along a longitudinal fiber axis 60 defined by the fiber 20 from a lead end 36 to a trail end 38. The lead end 36 is pre-terminated with a partial optical connector 22 that has sufficiently small transverse profile to be blown through a given duct. The partial connector 22 can include, e.g., a ferrule alone, or a ferrule and a spring. The ferrule can include a ferrule hub.

The trail end 38 is pre-terminated with a fully operational ruggedized fiber optic connector 44. The ruggedized connector 44 can include a twist-to-lock feature, such as screw threads and/or a bayonet style locking component to secure the connector 44 in a port of a fiber access terminal. The connector 44 can also include a sealing element, such as a gasket or O-ring for sealing off the port when the connector is connected thereto. Any desirable form factor can be provided for the connector, such as SC or LC form factors. Likewise, the partial connector 22 can be fully assembled into any desired form factor of connector, such as SC or LC form factors, using the appropriate connector housing and other connector components.

Figure 6:
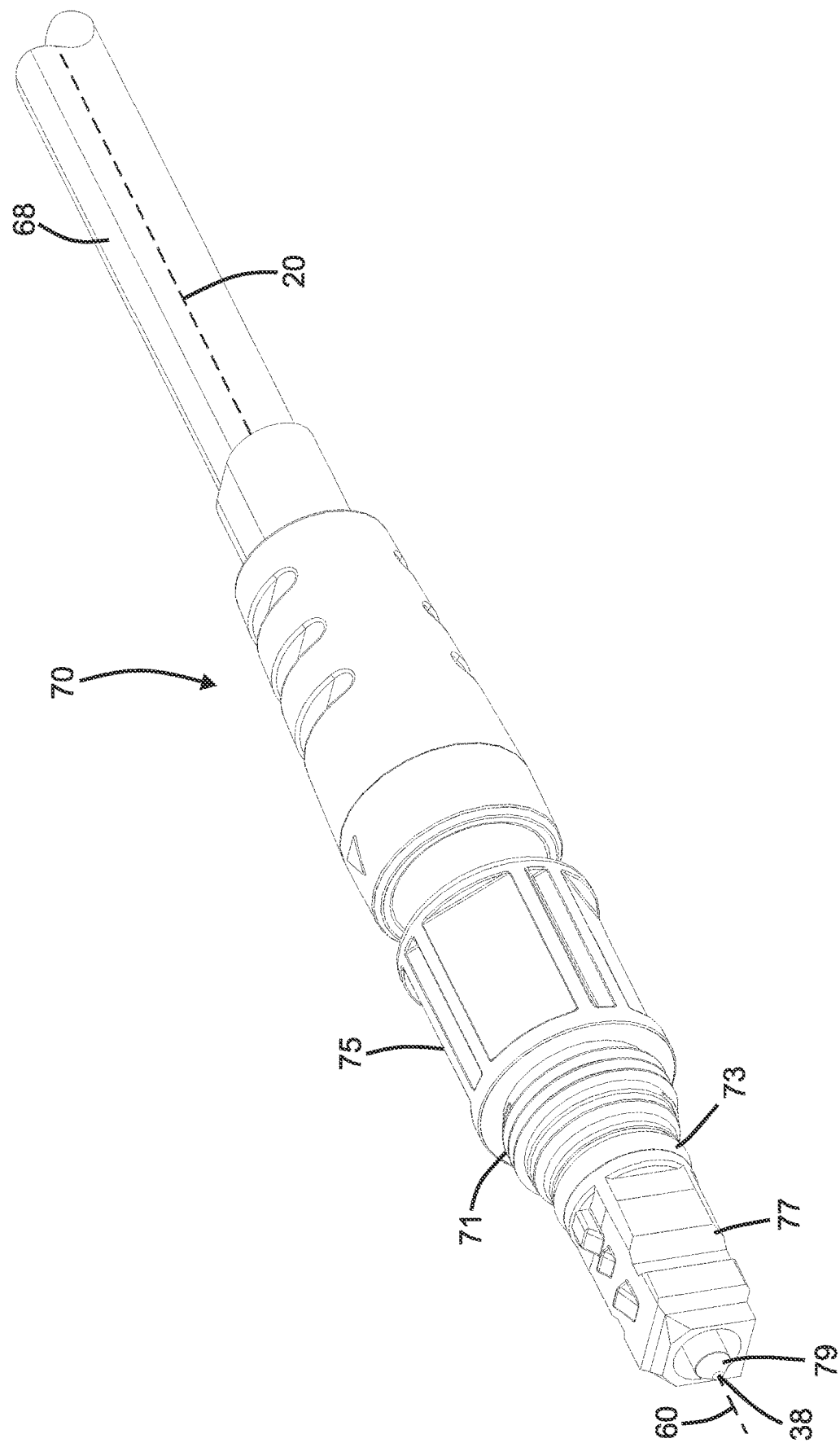
FIG. 6 is a perspective view of an example embodiment of the fiber access terminal of the system of FIG. 1.

An example ruggedized connector 70 that can represent the connector 44 is shown in FIG. 6. The connector 70 is secured to a sheathed section 68 (FIGS. 3, 6) of the optical fiber 20. The connector 70 includes a connector housing 77 supporting a ferrule 79 that terminates the fiber 20 at the trail end 38. The housing 77 is ruggedized with a coupling nut 75, screw threads 71 and a sealing element (e.g., a gasket) 73. The connector 70 can be sealingly installed in a ruggedized port of a fiber access terminal, such as the port 82 of the example terminal 80 shown in FIG. 5. The terminal 80 is an example embodiment of the terminal 12 of FIG. 1. The terminal 80 includes a main cable port 84 that can sealingly receive (e.g., with a cable grommet) a feeder cable, such as the feeder cable 14 (FIG. 1). Fibers of the feeder cable are managed within the closure volume defined by the terminal 80 and optically connected using connectors at an internal side of the ports 82 to the ruggedized connectors at external sides of the ports 82.

Additional non-limiting examples of ruggedized connectors that can be used for the connector 44 include the DLX style connectors by CommScope® (Hickory, North Carolina), the OPTITAP® connectors by Corning Incorporated (Corning, New York), and the FASTCONNECT connectors by Huawei Technologies Co., Ltd. (Shenzhen, China).

Referring again to FIG. 3, the blowable section or portion 62 of the fiber 20 has a longitudinal length L1 and the non-blowable section or portion 64 has a longitudinal length L2. In at least some examples, the length L1 is significantly longer than the length L2, since the blowing operation required to deploy the lead end of the fiber to a customer premises via a duct generally covers a much longer routing distance than connecting the trail end of the fiber to a ruggedized terminal. In some examples the length L1 is at least 10 times, at least 15 times, at least 20 times, at least 25 times, at least 30 times, at least 35 times, at least 40 times, at least 45 times, at least 50 times, or greater, than the length L2.

In some examples, L1 is in a range from about 10 meters to about 1,000 meters, or in a range from about 50 meters to about 800 meters. In some examples, L1 is less than or equal to about 700 meters. In some examples, L2 is at least 0.5 meters. In some examples, L2 is in a range from about 0.5 meters to about 5 meters. In some examples, L2 is in a range from about 1 meter to about 3 meters.

The blowable portion 62 includes an outer protective layer 66 that protects the bare fiber within. The outer protective layer 66 can be, e.g., a coating layer or a cladding layer. In at least some examples, no strengthening element, such as aramid yarn, is placed between the bare fiber and the outer protective layer 66, allowing the blowable portion 62 to remain relatively lightweight and have a relatively small cross-sectional profile to promote its blowability. The blowable portion 62 has a largest outer dimension D2 perpendicular to the longitudinal axis 60.

The non-blowable portion 64 includes an outer sheath 68 that receives the fiber 20. The sheath 68 can be, e.g., a protective tube or a cable jacket. Optionally, the non-blowable portion 64 can be ruggedized with a reinforcing layer or strength element 86, such as aramid yarn, positioned radially between the fiber 20 and the sheath 68. The strength element 86 and the sheath 68 can add durability and reinforcement against bending, and the sheath 68 can protect against egress of contaminants. The connector 44 can be sealingly secured to a trail end of the sheath 68. The sheath 68 includes a largest outer dimension D3.

The dimension D2 is smaller than the dimension D3. The dimension D2 is sufficiently small to allow the blowable section 62 to be blown through a given duct of predefined internal dimensions. In some examples, the dimension D3 is larger than the largest internal dimension of the duct (or duct channel) through which the blowable section 62 is to be blown. In some examples, the dimension D3 is at least 1.5 times, at least 2 times, at least 3 times, at least 4 times, at least 5 times, at least 6 times, at least 7 times, at least 8 times, at least 9 times, or at least 10 times the dimension D2. In some examples, the dimension D3 is least 1.05 times, at least 1.1 times, at least 1.2 times, at least 1.3 times, at least 1.4 times, at least 1.5 times, at least 1.6 times, at least 1.7 times, at least 1.8 times, at least 1.9 times, or at least 2.0 times the dimension D1 (FIG. 1). In some examples, the dimension D1 (FIG. 1) is least 1.05 times, at least 1.1 times, at least 1.5 times, at least 2 times, at least 3 times, at least 4 times, or at least 5 times the dimension D2. In some examples, the dimension D1 is in a range from about 3 millimeters to about 5 millimeters. In some examples, the dimension D2 is in a range from about 0.7 millimeters to about 1.5 millimeters. In some examples, the dimension D3 is in a range from about 4 millimeters to about 10 millimeters. Dimensions outside of these ranges are also possible. In some examples, the dimension D1 is in a range from about 3.5 millimeters to about 4.0 millimeters, the dimension D2 is about 1.1 millimeters, and the dimension D3 is about 5.0 millimeters.

The ruggedized connector 44 has a dimension D4 (FIG. 3) perpendicular to the longitudinal axis 60. The dimensions D4 is larger than the dimension D3. The dimension D4 is also larger than the dimension D1 (FIG. 1). In some examples, the dimension D4 is at least 7 millimeters, or at least 8 millimeters, or at least 9 millimeters, or at least 10 millimeters, or at least 11 millimeters, or at least 12 millimeters, or at least 13 millimeters, or at least 14 millimeters, or at least 15 millimeters, or greater. In some examples, the dimension D4 is least 1.05 times, at least 1.1 times, at least 1.2 times, at least 1.3 times, at least 1.4 times, at least 1.5 times, at least 1.6 times, at least 1.7 times, at least 1.8 times, at least 1.9 times, at least 2.0 times, at least 2.5 times, or at least 3.0 times the dimension D1 (FIG. 1).

Referring to FIG. 4, a modified version of the fiber 20 is shown. In this example, the fiber 20 includes a splice 90. The splice can be, e.g., a mechanical splice or a fusion splice. Additional splices can also be performed along the length of the optical fiber 20 including, optionally, with stub fibers pre-terminated at the connector 44 and/or partial connector 22. All splice(s) are completed prior to winding the fiber 20 on the spool 18 (FIG. 1).

Figure 7:
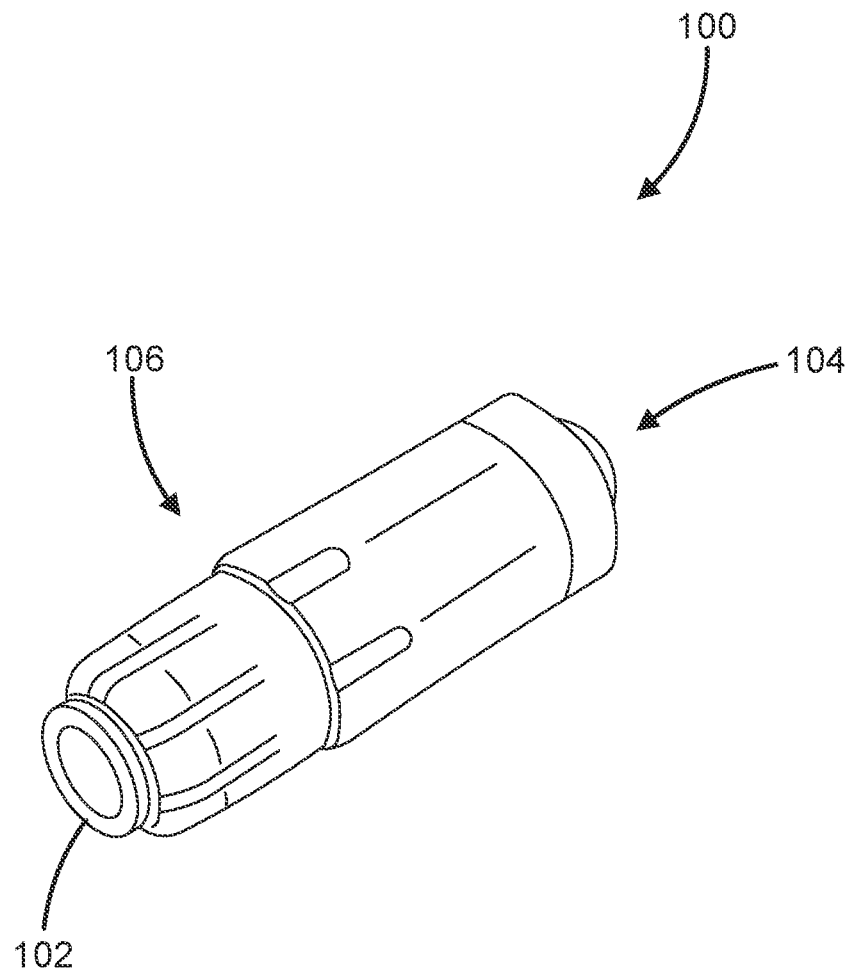
FIG. 7 is a perspective view of an example embodiment of the coupler of the fiber optic connector assembly of FIG. 4.

Still referring to FIG. 4, a coupler 92 is positioned around the fiber 20. The coupler 92 can be installed prior to winding the fiber 20 on the spool or after deployment of the blowable section of the fiber 20 to the customer premises. The coupler 92 has a lead end 94 and a trail end 96. A portion of the coupler adjacent its lead end 94 is adapted to receive, and/or be received by, the trail end 30 of the duct 6 (FIG. 1), and a portion of the coupler 92 adjacent its trail end 96 receives (and/or is received by) a lead end portion of the non-blowable section 64. Once the blowable section of the fiber has been deployed, the coupler 92 can be secured at both lead and front ends to the duct 6 and the sheath 68 of the non-blowable portion 64, respectively, to thereby secure the fiber connector assembly to the duct and minimize undesirable shifting of the fiber relative to the duct. Optionally, the coupler 92 is fitted with a gas block adapted to plug the trail end 30 of the duct 6 and minimize egress of gas or other contaminants into the duct 6. Optionally, the coupler 92 includes one or more blades that cut into the sheath 68 when securing the coupler 92 to the sheath. In some examples in which the coupler 92 includes a gas block, the coupler 92 is installed on the fiber 20 prior to winding the fiber 20 on the spool. An example embodiment of the coupler 92 is shown in FIG. 7. The coupler 100 of FIG. 7 is provided by Emtelle UK Limited (United Kingdom). The coupler 100 extends between a trail end 102 and a lead end 104. The trail end 102 defines an opening adapted to receive the sheath 68 (FIG. 4). The lead end 104 is adapted to fit about the trail end 30 of the duct 6 (FIG. 1). An actuator 106 can be operated to clamp the sheath 68 and engage the gas block with which the coupler 100 is fitted at the trail end 30 of the duct to seal off the duct about the fiber 20 at the trail end of the duct.

Figure 8:
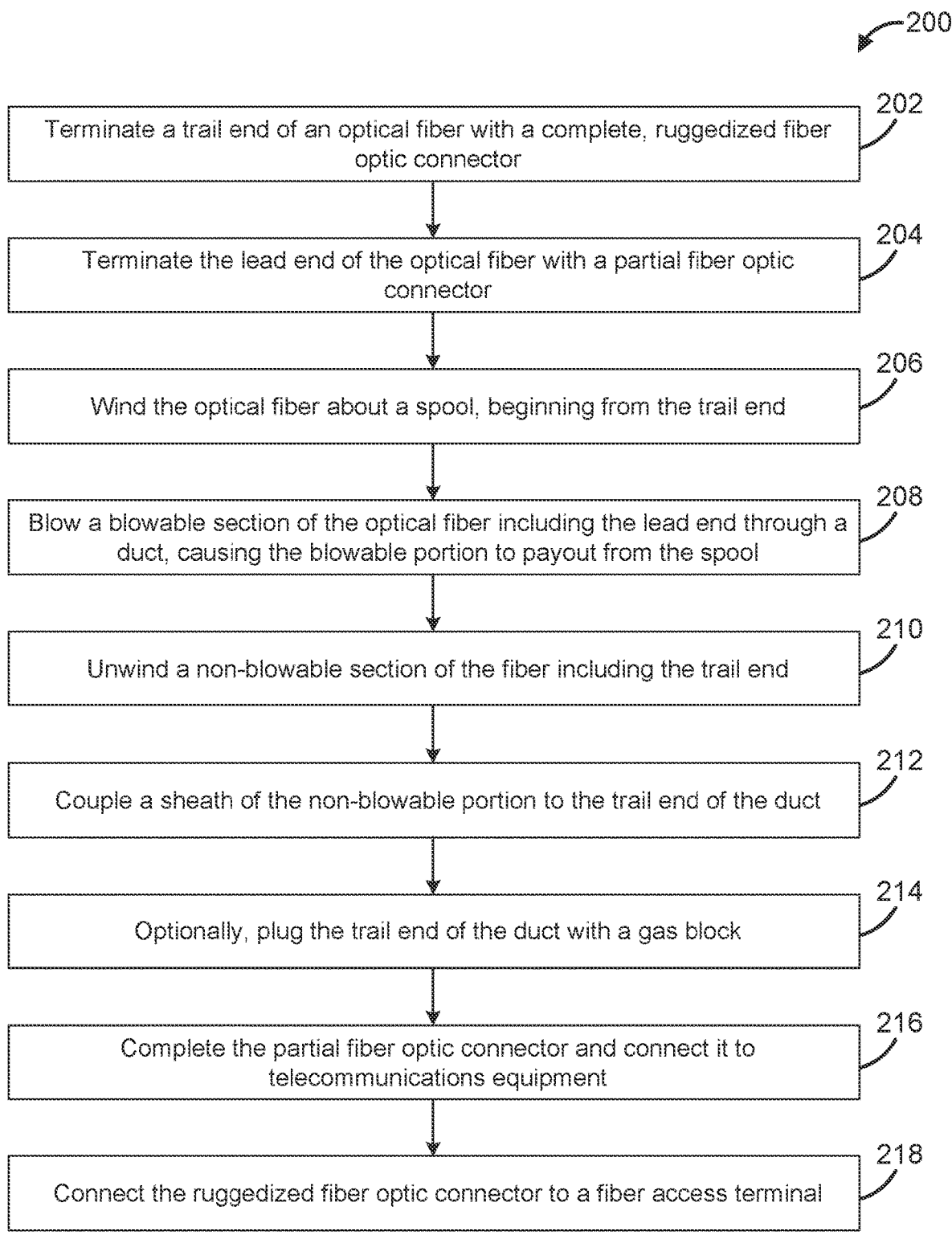
FIG. 8 is an example process flow for installing a fiber optic connector assembly in accordance with the present disclosure.

Referring now to FIG. 8, an example process flow 200 for installing a fiber optic connector assembly in accordance with the present disclosure will be described.

In an initial step 202 of the process 200, a trail end of the optical fiber is terminated with a complete, ruggedized fiber optic connector. In a step 204, the lead end of the optical fiber is terminated with a partial fiber optic connector. The steps 202 and 204 can be optionally performed in the reverse order. In a step 206, following the steps 202 and 204, the fiber is wound about a spool, beginning from the trail end, such that the lead end is farther from the spool's rotation axis than the trail end. In a step 208, following the step 206, a blowable section of the optical fiber extending from the lead end is blown, e.g., with a blowing machine, through a duct causing the blowable portion of the fiber to payout from the spool. In a step 210, following the step 208, the non-blowable section of the fiber including the trail end is removed (e.g., unwound) from the spool. In a step 212, following the step 210, an outer protective sheath of the non-blowable portion is coupled to the trail end of the duct, e.g., using a tube-to-tube coupler. In an optional step 214, the trail end of the duct is plugged with a gas block. Optionally, the gas block is a component of the tube-to-tube coupler. In a step 216, the partial fiber optic connector is completed at least by installing a connector housing, and the completed connector can be connected to telecommunications equipment at a customer premises. Optionally, slack loops of the blowable section that has exited the duct can be formed and stored at a fiber storage location at the customer premises. In a step 218, the ruggedized fiber optic connector is connected to a fiber access terminal, e.g., within the cavity of a hand hole. The steps 212, 214, 216 and 218 can be performed in any order following the step 210. It should be appreciated that not all steps in the process need to be performed and/or additional steps can be included.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A blown fiber assembly, comprising:
a spool;
an optical drop line including a blowable fiber section adapted to be blown through a fiber duct and a sheathed fiber section, the sheathed fiber section having an outer dimension at least 2 times as large as an outer dimension of the blowable fiber section, the blowable fiber section being at least 25 times as long as the sheathed fiber section, the blowable fiber section and the sheathed fiber section being coiled about the spool with the blowable fiber section being coiled about the spool farther from a rotation axis of the spool than the sheathed fiber section;
a partial connector factory terminated at an end of the blowable fiber section; and
a hardened fiber optic connector factory terminated at an end of the sheathed fiber section, the hardened fiber optic connector being positioned on a radially facing surface of the spool underneath the blowable fiber section such that the blowable fiber section covers the hardened fiber optic connector.

2. A blown fiber assembly, comprising:
a spool;
an optical drop line including a blowable fiber section adapted to be blown through a fiber duct and a sheathed fiber section, the blowable fiber section being at least 25 times as long as the sheathed fiber section, the blowable fiber section and the sheathed fiber section being coiled about the spool with the blowable fiber section being coiled about the spool farther from a rotation axis of the spool than the sheathed fiber section;
a partial connector factory terminated at an end of the blowable fiber section; and
a hardened fiber optic connector factory terminated at an end of the sheathed fiber section, the hardened fiber optic connector having an outer dimension that is at least 8 times as large as an outer dimension of the blowable fiber section, the sheathed fiber section having an outer diameter that is at least 4 times as large as the outer dimension of the blowable fiber section, and the sheathed fiber section being at least 0.5 meters long, wherein the hardened fiber optic is positioned on a radially facing surface of the spool underneath the blowable fiber section such that the blowable fiber section covers the hardened fiber optic connector.

3. The blown fiber assembly of claim 1, wherein the sheathed fiber section includes an outer layer defined by a cable jacket, and also includes an aramid reinforcing layer positioned within the cable jacket.

4. The blown fiber assembly of claim 1, wherein the sheathed fiber section includes an outer layer defined by a protective tube.

5. The fiber optic connector system of claim 1, wherein a trail end of a first axial section abuts a lead end of a second axial section at a junction.

6. The fiber optic connector system of claim 5, wherein the junction is configured to coincide with a trail end of the duct.

\* \* \* \* \*